(12) United States Patent
Boucher (10) Patent No.: US 6,910,107 B1
(45) Date of Patent: Jun. 21, 2005

(54) METHOD AND APPARATUS FOR INVALIDATION OF DATA IN COMPUTER SYSTEMS

(75) Inventor: Michael Boucher, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 389 days.

(21) Appl. No.: 09/644,089

(22) Filed: Aug. 23, 2000

(51) Int. Cl.[7] ............................................. G06F 12/00
(52) U.S. Cl. ......................... 711/141; 711/117; 711/171
(58) Field of Search ................................. 711/142, 143, 711/117, 122, 123, 133, 134, 141, 118, 144, 145, 203, 163, 128

(56) References Cited

U.S. PATENT DOCUMENTS

| | | | |
|---|---|---|---|
| 4,675,832 A | | 6/1987 | Robinson et al. ............... 710/6 |
| 4,685,082 A | * | 8/1987 | Cheung et al. ............... 365/49 |
| 4,812,996 A | | 3/1989 | Stubbs ........................... 710/6 |
| 5,073,851 A | * | 12/1991 | Masterson et al. ........... 711/140 |
| 5,075,847 A | | 12/1991 | Fromme ........................ 710/6 |
| 5,079,707 A | | 1/1992 | Bird et al. ................... 702/186 |
| 5,119,465 A | | 6/1992 | Jack et al. ..................... 710/6 |
| 5,146,593 A | | 9/1992 | Brandle et al. .............. 702/186 |
| 5,168,563 A | | 12/1992 | Shenoy et al. ................ 703/19 |
| 5,179,702 A | | 1/1993 | Spix et al. .................. 709/102 |
| 5,274,813 A | | 12/1993 | Itoh ........................... 717/127 |
| 5,274,821 A | | 12/1993 | Rouquie ..................... 717/139 |
| 5,297,274 A | | 3/1994 | Jackson ........................ 703/22 |
| 5,301,312 A | | 4/1994 | Christopher, Jr. et al. ... 702/186 |
| 5,325,499 A | | 6/1994 | Kummer et al. .............. 714/20 |
| 5,325,533 A | | 6/1994 | McInerney et al. ......... 702/186 |
| 5,353,401 A | | 10/1994 | Iizawa et al. ................ 712/236 |
| 5,390,314 A | | 2/1995 | Swanson ..................... 712/236 |

(Continued)

FOREIGN PATENT DOCUMENTS

| | | |
|---|---|---|
| DE | 199 34 515 A1 | 1/2000 |
| EP | 0 390 339 A2 | 3/1990 |
| EP | 0 703 534 A | 3/1996 |
| EP | 0 817 044 A2 | 1/1998 |
| EP | 0 965 921 A2 | 12/1999 |
| EP | 1 026 592 A2 | 2/2000 |
| EP | 1 024 432 A | 8/2000 |
| EP | 1 081 585 A1 | 3/2001 |
| FR | 2 793 908 A1 | 11/2000 |
| GB | 2 324 942 A | 11/1998 |
| GB | 2 343 029 | 4/2000 |
| GB | 2 357 873 | 7/2001 |
| JP | 03-282731 A | 12/1991 |
| JP | 07-056716 A | 3/1995 |
| WO | WO 99/10812 A | 3/1999 |

OTHER PUBLICATIONS

Handy, "The Cache Memory Book", © 1998, pp. 55, 66, 67, 155.*

(Continued)

Primary Examiner—Donald Sparks
Assistant Examiner—Brian R. Peugh
(74) Attorney, Agent, or Firm—Finnegan, Henderson, Farabow, Garrett & Dunner, L.L.P.

(57) ABSTRACT

Methods and systems consistent with this invention conserve computer resources in a hierarchical memory system by preventing scratch data from unnecessarily being copied from a lower hierarchy to a higher hierarchy storage space. Such methods and systems invalidate portions of data in the higher hierarchy storage space so that the coherence protocol does not copy the data to the lower hierarchy storage space. For example, methods and systems consistent with this invention hierarchically store data in a computer system having a main memory and a cache memory. Such methods and systems designate an area of the cache memory that contains scratch data as invalid, wherein the invalid data occupies less space than a maximum space of the cache memory, and permit a writing over of the invalid data in the cache memory.

91 Claims, 8 Drawing Sheets

U.S. PATENT DOCUMENTS

| | | | |
|---|---|---|---|
| 5,438,659 A | 8/1995 | Notess et al. ................. | 712/43 |
| 5,485,619 A | 1/1996 | Lai et al. ...................... | 712/43 |
| 5,497,458 A * | 3/1996 | Finch et al. .................. | 714/30 |
| 5,499,349 A | 3/1996 | Nikhil et al. ................ | 712/236 |
| 5,500,881 A | 3/1996 | Levin et al. .................. | 712/43 |
| 5,519,866 A | 5/1996 | Lawrence et al. ............ | 714/20 |
| 5,530,816 A | 6/1996 | Holt ............................ | 714/38 |
| 5,535,393 A | 7/1996 | Reeve et al. ................ | 717/149 |
| 5,539,907 A | 7/1996 | Srivastava et al. .......... | 717/130 |
| 5,553,235 A | 9/1996 | Chen et al. ................... | 714/20 |
| 5,574,922 A | 11/1996 | James ........................ | 712/220 |
| 5,613,063 A | 3/1997 | Eustace et al. ............... | 714/38 |
| 5,636,374 A | 6/1997 | Rodgers et al. ............... | 714/38 |
| 5,640,550 A | 6/1997 | Coker .......................... | 707/4 |
| 5,673,387 A | 9/1997 | Chen et al. ................... | 714/38 |
| 5,675,790 A | 10/1997 | Walls .......................... | 714/38 |
| 5,675,802 A | 10/1997 | Allen et al. ................ | 707/206 |
| 5,689,712 A | 11/1997 | Heisch ......................... | 711/3 |
| 5,696,937 A * | 12/1997 | White et al. ................ | 711/142 |
| 5,710,727 A | 1/1998 | Mitchell et al. .............. | 714/20 |
| 5,724,262 A | 3/1998 | Ghahramani ................. | 712/236 |
| 5,737,605 A | 4/1998 | Cunningham et al. ...... | 719/312 |
| 5,740,431 A | 4/1998 | Rail ........................... | 707/200 |
| 5,742,793 A | 4/1998 | Sturges et al. .............. | 712/227 |
| 5,745,897 A | 4/1998 | Perkins et al. ................ | 714/38 |
| 5,748,892 A | 5/1998 | Richardson ................. | 709/200 |
| 5,748,961 A | 5/1998 | Hanna et al. .................. | 711/5 |
| 5,754,820 A * | 5/1998 | Yamagami ................. | 711/133 |
| 5,761,426 A | 6/1998 | Ishizaki et al. ............... | 714/38 |
| 5,774,724 A | 6/1998 | Heisch ........................ | 714/38 |
| 5,784,698 A | 7/1998 | Brady et al. ................ | 709/231 |
| 5,787,285 A | 7/1998 | Lanning ..................... | 717/130 |
| 5,787,480 A | 7/1998 | Scales et al. .................. | 710/6 |
| 5,805,795 A | 9/1998 | Whitten ...................... | 714/38 |
| 5,812,799 A | 9/1998 | Zuravleff et al. ............. | 710/52 |
| 5,835,705 A | 11/1998 | Larsen et al. ................ | 714/38 |
| 5,850,554 A | 12/1998 | Carver ....................... | 702/186 |
| 5,860,024 A | 1/1999 | Kyle et al. ...................... | 710/6 |
| 5,864,867 A | 1/1999 | Krusche et al. ............. | 712/236 |
| 5,867,649 A | 2/1999 | Larson ........................ | 712/43 |
| 5,867,735 A | 2/1999 | Zuravleff et al. ............. | 710/52 |
| 5,872,977 A | 2/1999 | Thompson .................. | 714/20 |
| 5,905,488 A | 5/1999 | Demers et al. ............... | 714/32 |
| 5,905,856 A | 5/1999 | Ottensooser ................ | 707/206 |
| 5,913,223 A * | 6/1999 | Sheppard et al. ........... | 711/118 |
| 5,920,895 A * | 7/1999 | Perazzoli et al. ............ | 711/163 |
| 5,940,616 A | 8/1999 | Wang ......................... | 717/127 |
| 5,963,975 A | 10/1999 | Boyle et al. ................. | 714/38 |
| 5,968,114 A | 10/1999 | Wentka et al. ............... | 718/100 |
| 5,970,510 A | 10/1999 | Sher et al. ................... | 711/149 |
| 5,974,510 A * | 10/1999 | Cheng et al. ............... | 711/138 |
| 5,974,536 A | 10/1999 | Richardson ................ | 714/38 |
| 5,978,892 A | 11/1999 | Noel et al. ................... | 707/206 |
| 5,991,708 A | 11/1999 | Levine et al. ................ | 702/186 |
| 5,991,893 A | 11/1999 | Snider ......................... | 711/3 |
| 6,006,031 A | 12/1999 | Andrews et al. ............. | 714/20 |
| 6,009,514 A | 12/1999 | Henzinger et al. .......... | 712/236 |
| 6,014,517 A | 1/2000 | Shagam et al. .............. | 714/38 |
| 6,016,474 A | 1/2000 | Kim et al. ................... | 712/227 |
| 6,018,793 A | 1/2000 | Rao ............................. | 711/5 |
| 6,023,583 A | 2/2000 | Honda ......................... | 714/38 |
| 6,044,438 A | 3/2000 | Olnowich ................... | 709/231 |
| 6,049,798 A | 4/2000 | Bishop et al. ................ | 707/10 |
| 6,052,708 A | 4/2000 | Flynn et al. .................. | 714/38 |
| 6,052,763 A | 4/2000 | Maruyama ................. | 711/152 |
| 6,055,368 A | 4/2000 | Kunioka ..................... | 711/3 |
| 6,065,019 A | 5/2000 | Ault et al. ................... | 707/206 |
| 6,066,181 A | 5/2000 | DeMaster ................... | 717/148 |
| 6,072,951 A | 6/2000 | Donovan et al. ........... | 717/158 |
| 6,077,312 A | 6/2000 | Bates et al. ................ | 712/227 |
| 6,081,868 A | 6/2000 | Brooks .......................... | 711/3 |
| 6,085,029 A | 7/2000 | Kolawa et al. ............... | 710/6 |
| 6,088,771 A | 7/2000 | Steely, Jr. et al. .......... | 711/154 |
| 6,098,169 A | 8/2000 | Ranganathan ............... | 712/227 |
| 6,101,325 A | 8/2000 | Flaat ............................ | 714/38 |
| 6,101,525 A | 8/2000 | Hecker ...................... | 702/186 |
| 6,119,198 A | 9/2000 | Fromm ........................ | 711/5 |
| 6,125,430 A | 9/2000 | Noel et al. .................. | 712/236 |
| 6,141,692 A * | 10/2000 | Loewenstein et al. ...... | 709/234 |
| 6,145,054 A | 11/2000 | Mehrotra et al. ........... | 711/119 |
| 6,167,565 A | 12/2000 | Kanamori ................... | 707/206 |
| 6,173,327 B1 | 1/2001 | De Borst et al. .......... | 709/231 |
| 6,173,368 B1 * | 1/2001 | Krueger et al. ............. | 711/135 |
| 6,205,537 B1 | 3/2001 | Albonesi ..................... | 712/43 |
| 6,223,134 B1 | 4/2001 | Rust et al. .................... | 712/43 |
| 6,253,252 B1 | 6/2001 | Schofield ...................... | 710/6 |
| 6,263,485 B1 | 7/2001 | Schofield .................... | 702/186 |
| 6,269,457 B1 | 7/2001 | Lane ............................ | 714/38 |
| 6,282,702 B1 | 8/2001 | Ungar ....................... | 717/148 |
| 6,286,130 B1 | 9/2001 | Poulsen et al. ............. | 712/236 |
| 6,295,600 B1 | 9/2001 | Parady ....................... | 712/228 |
| 6,304,951 B1 * | 10/2001 | Mealey et al. .............. | 711/206 |
| 6,311,320 B1 | 10/2001 | Jibbe ............................ | 714/43 |
| 6,314,429 B1 | 11/2001 | Simser ......................... | 711/3 |
| 6,317,871 B1 | 11/2001 | Andrews et al. ............ | 712/227 |
| 6,351,845 B1 | 2/2002 | Hinker et al. ................. | 714/20 |
| 6,353,829 B1 | 3/2002 | Koblenz et al. ............ | 707/100 |
| 6,353,869 B1 | 3/2002 | Ofer et al. ................... | 710/200 |
| 6,369,725 B1 | 4/2002 | Busaba ....................... | 341/84 |
| 6,430,657 B1 | 8/2002 | Mittal et al. ................ | 711/138 |
| 6,434,714 B1 | 8/2002 | Lewis et al. ................ | 714/38 |
| 6,438,745 B1 | 8/2002 | Kanamaru et al. ............ | 711/5 |
| 6,442,162 B1 | 8/2002 | O'Neill et al. .............. | 370/389 |
| 6,480,818 B1 | 11/2002 | Alverson et al. ............ | 703/26 |
| 6,496,902 B1 * | 12/2002 | Faanes et al. ............... | 711/118 |
| 6,502,136 B1 | 12/2002 | Higuchi et al. ............. | 709/226 |
| 6,523,090 B2 * | 2/2003 | Tremblay .................... | 711/125 |
| 6,542,919 B1 | 4/2003 | Wendorf et al. ............. | 718/100 |
| 6,574,725 B1 * | 6/2003 | Kranich et al. ............... | 712/31 |
| 6,629,214 B1 | 9/2003 | Arimilli et al. .............. | 711/145 |
| 6,647,546 B1 | 11/2003 | Hinker et al. ............... | 711/137 |
| 6,684,296 B2 * | 1/2004 | Hayter et al. ............... | 711/118 |
| 2001/0051974 A1 | 12/2001 | Saad .......................... | 709/202 |
| 2002/0046201 A1 | 4/2002 | Hembry ........................ | 707/1 |
| 2002/0073360 A1 | 6/2002 | Lewis et al. ................ | 714/38 |
| 2002/0078010 A1 | 6/2002 | Ehrman et al. ................ | 707/1 |
| 2003/0061395 A1 | 3/2003 | Kingsbury et al. ......... | 709/312 |

OTHER PUBLICATIONS

"Visual Basic 5.0 Introduction," Windows 95 Student Manual 1997, XP00296932.

Cantrill, B.M. et al., "ThreadMon: A Tool for Monitoring Multithreaded Program Performance," System Sciences, 1997 Proceedings of the Thirtieth Hawaii Int'l Conference of Wailea, HI, USA Jan. 7–10 1997, pp. 253–265.

Grundy, J.C., et al., "Supporting Flexible Consistency Management Via Discrete Change Description Propagation," Software Practice & Experience, John Wiley & Sons Ltd. Chichester, GB, vol. 26, Sep. 1996, pp. 1053–1083, No. 9 XP000655597.

Karavanic K.L. et al., "Integrated Visualization of Parallel Program Performance Data," vol. 23, No. 1, Apr. 1, 1997, pp. 181–198.

Xu, Miller & Naim, "Dynamic Instrumentation of Threaded Applications," Internet Article, Online,URL:ftp://ftp.cs.wisc.edu/paradyn/technical papers/threads.pdf Oct. 29, 1998, pp. 1–16.

Buckley, A., "Conversion to Fortran 90: A Case Study," ACM Transactions on Mathematical Software, 1994, pp. 308–353.

Purtilo, J. et al., "Module Reuse by Interface Adaption", Software—Practice and Experience, 1991, pp. 539–556.

"Code Complete: A Practical Handbook of Software Construction," Steve McConnell, 1993, Microsoft Press.

IBM Technical Disclosure Bulletin, "Caching Objects in a Data Space," Oct. 1, 1994, vol. No. 37, pp. 587–590.

Microsoft Press, "Microsoft Press Computer Dictionary: Third Edition", 1997, p. 101.

"Algorithm Visualization System: Introduction," available online at: www.cp/eng.chula.ac.th/faculty/spj/research/avis/intro.html as of Jun. 10, 1999, 2 pages.

"Caching Objects In A Data Space," IBM Technical Disclosure Bulletin, IBM Corp., vol. 37, No. 10, Oct. 1994, pp. 587–590.

"GeoMAMOS Project Home Page," available online at: www.ece.nwu.edu/~theory/geomamos.html as of Jun. 10, 1999, 4 pages.

"Introduction," available online at: www.ece.nwu.edu/~theory/gs_1_html/section 3_1.html as of Jun. 10, 1999, 3 pages.

"Purify for Windows NT, Product Overview," Ver. 6.0, available online at: www.rational.com/products/purify_nt/prodinfo/index.jtmpl as of Jan. 11, 1999, 3 pages.

"Scientific Simulations and Algorithm Visualizations Using NESL and Java," available online at: www.cs.cmu.edu/~scandal/applets/ as of Jun. 10, 1999, 1 page.

"Visualization for Developing Geometric Algorithms," available online at: www.ece.nwu.edu/~theory/gs_tech_1_html/section3_3.html as of Jun. 10, 1999, 2 pages.

Attali et al., "Semantic–Based Visualization for Parallel Object–Oriented Programming," Proceedings of the 11th Annual Conference on Object Oriented Programing Systems, 1996, pp. 421–440.

Barry Wilkinson et al., "Parallel Programming," Prentice Hall, 1999.

Conradi et al., "Version Models for Software Configuration Management," ACM Computing Surveys, vol. 30, No. 2, Jun. 1998, pp. 232–282.

David E. Culler et al., "Parallel Computer Architecture", Morgan Kaufman Publishers, Inc., San Francisco, California, 1999.

Ian Foster, "Designing and Building Parallel Programs", Addison–Wesley Publishing Company, 1995.

Kevin Dowd and Charles R. Severance, "High Performance Computing," Second Edition, Chapter 10, Shared Memory Multiprocessors, Aug. 1998, pp. 216–218.

Sun Microsystems Computer Company, "Prism 5.0 Reference Manual," Revision A., Nov. 1997.

Sun Microsystems, "UltraSPARC User's Manual," UltraSPARC–1, UltraSPARC–II, Jul. 1997, pp. 319–325.

Wasserman et al., "A Graphical, Extensible Integrated Environment for Software Development," Proceedings of the ACD SIGSOFT/SIGPLAN Software Engineering Symposium on Practical Software Development Environments, 1986, pp. 131–142.

"dcpid—DIGITAL Continuous Profiling Infrastructure daemon", Man pages for SCR–Installed Programs (Alpha/NT), Online <URL:http://research.compaq.com/SRC/dcpi/html/ntalpha/dcpi.html>, 1997, pp. 1–6.

Browne et al., "PAPI: Portable Interface to Hardware Performance Counters," Cewes Major Shared Resources Center Pet Technical Reports, vol. 99–06, 1999, Online, <URL:http://www.wes.hpc.mil/pet/tech_reports/reports/pdf/tr_9906.pdf>, pp. 3–13.

IBM Technical Disclosure Bulletin, "Internal Performance Measurement Counters," IBM Corp., vol. 34, No. 4A, Sep. 1991, pp. 51–52 (the whole document).

IBM Technical Disclosure Bulletin, "Simultaneous Viewing of Performance Monitor Data Independent of Counters," IBM Corp., vol. 39, No. 10, Oct. 1996, pp. 181–183.

Zagha et al., "Performance Analysis Using the MIPS R10000 Performance Counters", SC96 Technical Papers, Online, <URL:http://www.supercomp.org/sc96/proceedings/SC96PROC/ZAGHA/INDEX.HTM>, Nov. 1996, pp. 1–22.

Nathan B. Kropp, Philip J. Koopman, Daniel P. Siewiorek, "Automated Robustness Testing of Off–the–Shelf Software Components," Institute for Complex Engineered Systems, Carnegie Mellon University, Pittsburgh, PA, pp. 230–239, IEEE (1998).

Valvano, "Debugging Strategies," Chapter 6, pp. 6.1—6.10, Real Time Debugging, Online Manual, Jun. 7, 1999, Retrieved from the Internet: <URL:http://www.ece.utexas.edu/{valvano/EE360P/PDF/Ch6.pdf>.

Broberg et al., "Visualization and Performance Prediction of Multithreaded Solaris Programs by Tracing Kernel Threads", Department of Software Engineering and Computer Science, University of Karlskrona/Ronneby, Sweden, 7 pages.

Haggander et al., "Optimizing Dynamic Memory Management in a Multithreaded Application Executing on a Multiprocessor," International Conference on Parallel Processing, 1998, Minneapolis, MN, Aug. 10–14, 1998, pp. 262–269.

Larson et al., "Memory Allocation for Long–Running Server Applications," ISMM 1998, International Symposium on Memory Management, Vancouver, BC, Canada, Oct. 17–19, 1998, vol. 34, No. 3, pp. 176–185.

Metcalf, Michael, "CERN," Geneva 1991, 1997 pp. 1–27, ftp://ftp>numerical.rl.ac.uk/pub/MandR/convert.f90.

Pentium™ Processor Family User Manual Volume 3: Architecture and Programming Manual pp. 25–182, 25–283, 25–309 and 25–310 (1994).

* cited by examiner

METHOD AND APPARATUS FOR INVALIDATION OF DATA IN COMPUTER SYSTEMS

FIELD OF THE INVENTION

The present invention relates to the field of data storage, and more particularly to methods and systems for invalidating data in a hierarchical data storage system.

BACKGROUND OF THE INVENTION

A computer typically has a main memory that stores data that is accessed by a processor. In the typical configuration, main memory consists of dynamic random access memory (DRAM). To improve the speed at which data is retrieved from the main memory, a cache memory (a higher-speed data storage medium than the main memory) is often placed between the main memory and the processor. Memory caching is effective because many computer programs that run in the processor repeatedly access the same data. By keeping as much of this data as possible in the cache memory, the computer avoids accessing the slower main memory and instead accesses the higher speed cache memory.

When the processor needs to access data from memory, it first checks the cache memory to see if the data is there. If the data is in the cache memory, it is retrieved without accessing the main memory. Memory caching may dramatically improve the performance of applications because accessing a byte of data in cache memory can be many times faster than accessing a byte in main memory. This speed difference is possible because cache memory is usually made of high-speed static random access memory (SRAM) instead of the slower and cheaper DRAM.

Alternatively, cache memories may be built into the architecture of microprocessors. For example, the 80486 and the Pentium microprocessors from Intel Corporation contain cache memory.

Another form of caching, similar to memory caching, is disk caching. Disk caching works under the same principle as memory caching, but instead of using high-speed SRAM, a disk cache may use conventional main memory. The most recently accessed data from the disk (and possibly adjacent sectors) is stored in the disk cache. When the processor needs to access data from the disk, it first checks the disk cache to see if the data is there. If the data is there, it is retrieved without accessing the disk drive. Disk caching can dramatically improve the performance of programs in the processor because accessing a byte of data from RAM can be thousands of times faster than accessing a byte on a hard disk.

Memory caching and disk caching are considered "hierarchical" memory systems. For instance, in memory caching, the slower main memory is lower in the hierarchy than the faster cache memory. It is also possible that there are several layers of cache memory, where a second cache memory is placed between a first cache and the processor. In this case, the second cache memory is higher in the hierarchy than the first cache memory. Similarly, with disk caching, the slower disk drive is lower in the hierarchy than the faster main memory.

With memory caching, the processor may write to a memory address whose data is stored in the cache memory. In this case, the processor may write the data to the cache memory but may not to the main memory. Thus, for periods of time it is possible that the cache memory is current, i.e., up-to-date, but the main memory is not current. It is the function of a "coherence protocol" to eventually copy the data in the cache memory to the main memory to keep the main memory current.

Cache memory is typically much smaller than main memory. Eventually, the cache memory may become full, and the coherence protocol will copy some data in the cache memory to the main memory to make room for new, more-ofen accessed data from the main memory. Copying data from the cache memory to the main memory, however, is time consuming for the computer system. Often, the data the coherence protocol copies to the main memory is trash or "scratch" data that may be discarded. As a result, the coherence protocol wastes computer resources by copying useless data from the cache memory to the main memory.

The Intel Pentium chip provides for a way to prevent data in the cache memory from being copied to the main memory. Using an "INVD" instruction, the entire cache memory may be marked "invalid," so that the data in the cache memory is not copied to the main memory. This command is used for initialization processes, however, and is impractical for use during normal processing. Because this instruction invalidates the entire cache memory, if the instruction were used during normal processing it is likely that useful, necessary data would be invalidated. Thus, the Intel Pentium chip "INVD" instruction does not address the problem of wasting computer resources by copying scratch data from the cache memory to the main memory during normal processing.

Disk caching has the same problem as memory caching. For instance, coherence protocols in a disk caching system may unnecessarily copy scratch data from main memory to the disk drive, wasting computer resources. Other hierarchical storage systems such as virtual memory and non-uniform memory access (NUMA) also encounter this problem.

NUMA is a type of parallel processing architecture in which each processor has a designated local memory but can also access remote memory owned by remote processors. It is "non-uniform" because the memory access times are faster when a processor accesses its own local memory than when it accesses memory of a remote processor. To increase memory access times in a NUMA system, the local memory may also act as a cache memory between the local processor and the memory of a remote processor. A coherence protocol functions to keep the remote memory current by coping data from the local memory to the remote memory when necessary. Thus, the processor's own local memory is higher in the hierarchy than the remote processor's memory. In this situation, the coherence protocol may unnecessarily copy scratch data from the local memory to the remote processor's memory.

Virtual memory is a type of memory management where some data that would otherwise be stored in main memory is stored on a disk drive instead, possibly because there is not enough main memory to store all the data. The access times of disk drives, as discussed above, is typically slower than the access times of main memory. To increase memory access times in a virtual memory system, the frequently accessed data is stored in main memory. A coherence protocol functions to keep the data stored on the disk drive current by copying data from the main memory to the disk drive when necessary. Thus, the main memory has a higher hierarchy than the disk drive. In this situation, similar to disk caching, the coherence protocol may unnecessarily copy scratch data from the main memory to the disk drive.

More generally, therefore, it is desirable to provide a way to save computer system resources in a hierarchical data storage system by preventing scratch data from being copied from a higher hierarchy data storage space to a lower hierarchy data storage space.

SUMMARY OF THE INVENTION

Methods and systems consistent with this invention hierarchically store data in a computer system comprising a first storage space for storing data, a second storage space for storing data, wherein the first storage space is lower in a hierarchy than the second storage space. Such methods and systems designate an area of the second storage space that contains scratch data as invalid, and permit a writing over of the invalid data in the second storage space. Further, during operation of a coherence protocol, only the area not designated as invalid is copied from the second to the first storage space.

Methods and systems consistent with this invention hierarchically store data in a computer system having a main memory and a cache memory. Such methods and systems designate an area of the cache memory that contains scratch data as invalid, wherein the invalid data occupies less space than a maximum space of the cache memory, and permit a writing over of the invalid data in the cache memory.

Methods and systems consistent with this invention hierarchically store data in a computer system including a virtual memory having a main memory and a disk storage space. Such methods and systems determine an area of the main memory that contains scratch data as invalid, and permit a writing over of the invalid data in the main memory.

Methods and systems consistent with this invention hierarchically store data in a non-uniform memory accessing computer system having a remote memory and a local memory. Such methods and systems designate an area of the local memory that contains scratch data as invalid, and permit a writing over of the invalid data in the local memory.

The summary and the following detailed description should not restrict the scope of the claimed invention. Both provide examples and explanations to enable others to practice the invention.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Overview

The following description of embodiments of the present invention refers to the accompanying drawings. Where appropriate, the same reference numbers in different drawings refer to the same or similar elements.

Methods and systems consistent with this invention conserve computer resources in a hierarchical memory system by preventing scratch data from unnecessarily being copied from a higher hierarchy to a lower hierarchy storage space. Such methods and systems invalidate portions of data in the higher hierarchy storage space so that the coherence protocol does not copy the invalidated data to the lower hierarchy storage space.

For instance, suppose an application running in a processor calculates the value of $R^2$ where $R^2=x^2+y^2$. The application first calculates $x^2$ and stores the result at a first address. The application then calculates $y^2$ and stores the result at a second address. Finally, the application sums the values at first and second address and stores this, $R^2$, at a third address. The data at first, second, and third addresses may be stored in a high hierarchy memory, such as a cache memory. The data at the first and second addresses, however, are no longer needed and are scratch data. Methods and systems consistent with this invention mark the scratch data at the first and second addresses as invalid. Then, the coherence protocol may save computer resources by not copying the scratch data at first and second address to lower levels of the memory hierarchy, such as a main memory.

In a disk caching application, first and second addresses are disk addresses, and the application instructs the disk cache to mark the scratch data as invalid. If the disk cache stores the scratch data, then the scratch data is marked invalid. Then, the coherence protocol may save computer resources by not copying the scratch data from main memory to the disk drive.

In a virtual memory application, first and second disk addresses are memory addresses, similar to the situation in memory caching. The application instructs the virtual memory to mark the scratch data as invalid. If the main memory of the virtual memory stores the scratch data, the data is marked invalid. Then, the coherence protocol may save computer resources by not copying the scratch data to the disk.

In an NUMA-based application, first and second addresses are also memory addresses. The application instructs the NUMA system to mark the scratch data as invalid. If the local memory stores the scratch data, the data is marked invalid. Then, the coherence protocol may save computer resources by not copying the scratch data to the remote memory.

Implementation Details

Figure 1:
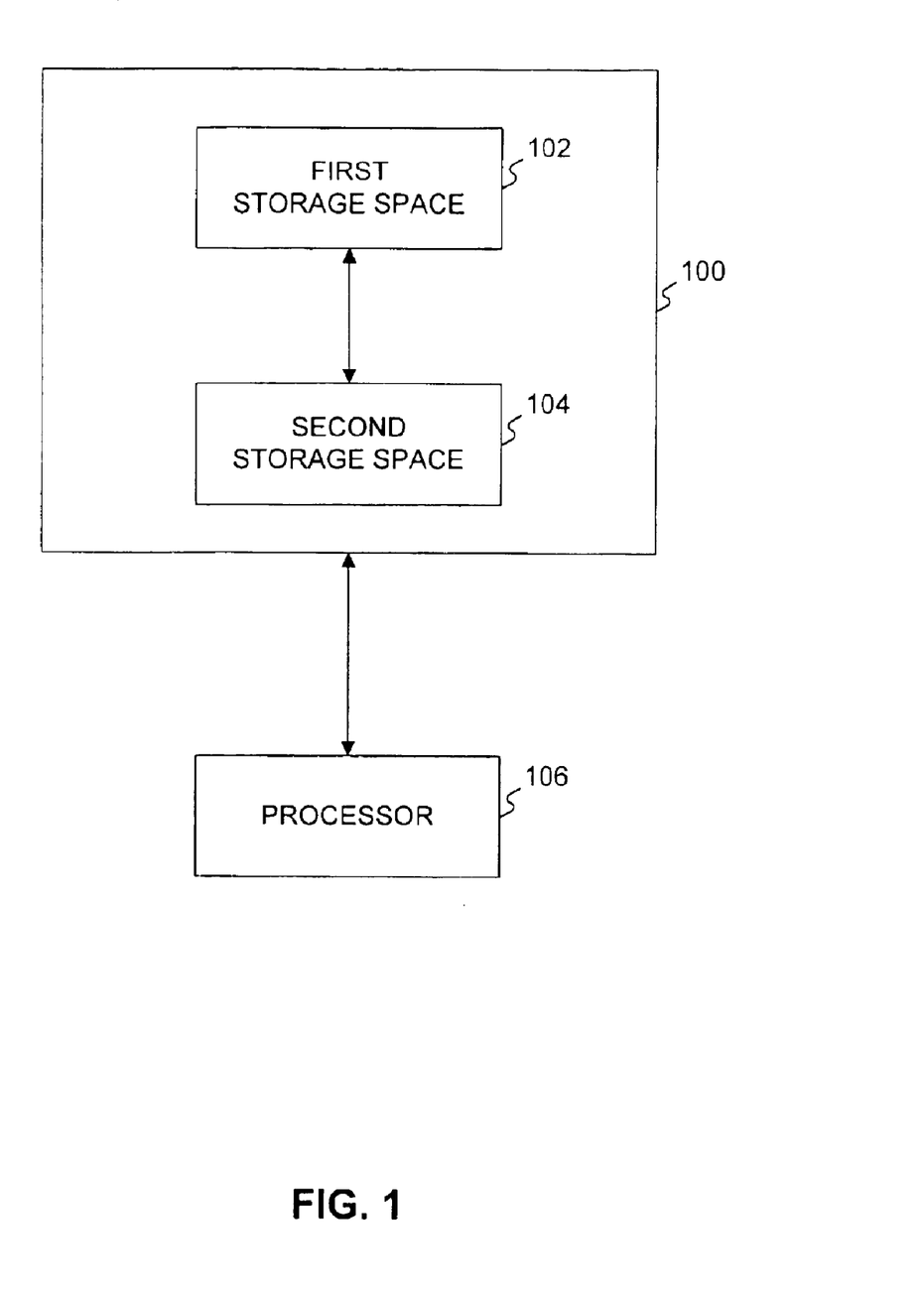
FIG. 1 is a block diagram of a general hierarchical storage structure consistent with this invention.

FIG. 1 is a block diagram of a general hierarchical storage structure 100, consistent with this invention. General hierarchical storage structure 100 comprises a first storage space 102, and a second storage space 104. First storage space 102 is lower in a hierarchy for data storage than second storage space 104. A processor 106, such as a CPU, is in communication with general hierarchical storage structure 100.

Methods and systems consistent with this invention hierarchically store data in a computer system comprising first storage space 102 and second storage space 104. Such methods and systems designate an area of second storage space 104 that contains scratch data as invalid, and permit a writing over of the invalid data in second storage space 104 with new data. Such methods and systems may then copy only the data not marked as invalid data from the second storage space 104 to first storage space 102.

Figure 2:
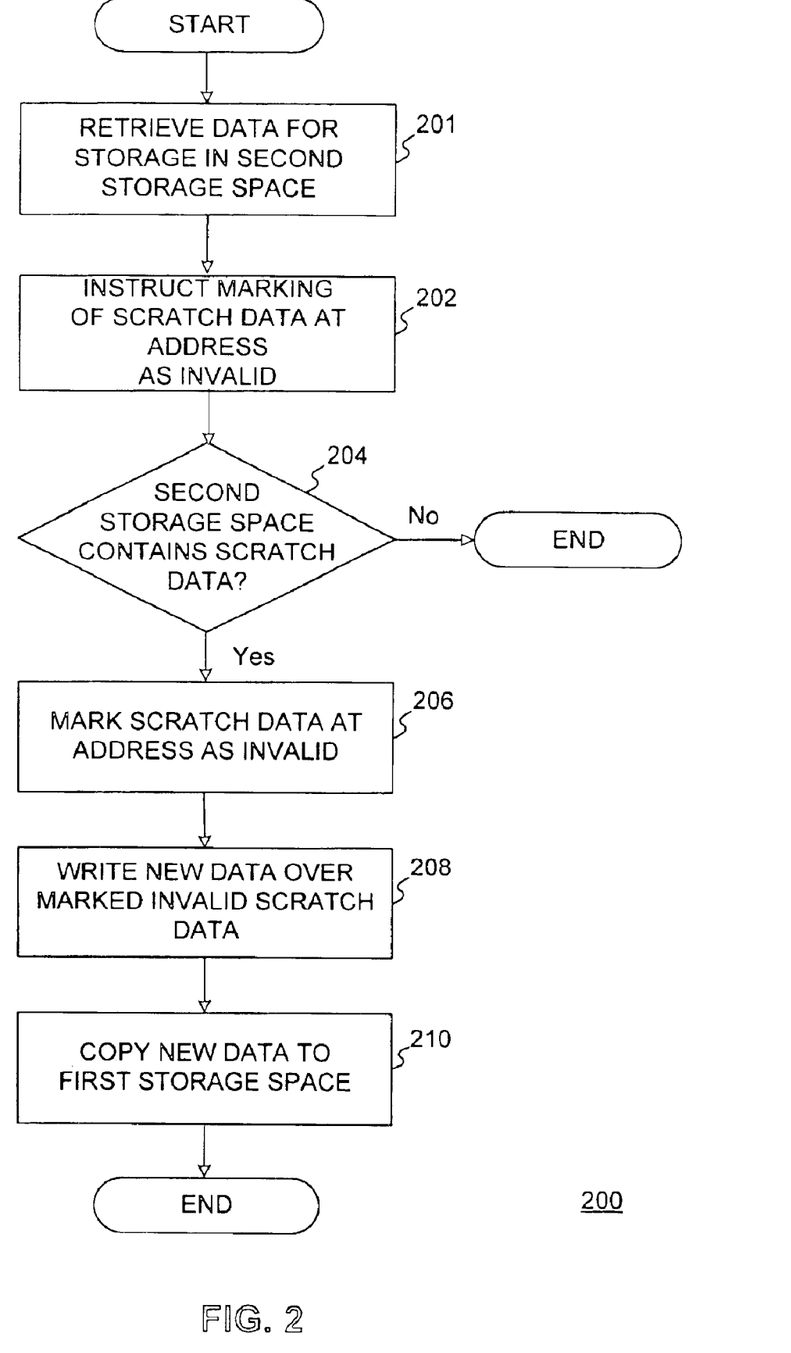
FIG. 2 is a flow diagram of a process for hierarchically storing data in the general hierarchal storage space of FIG. 1 in a manner consistent with this invention.

For example, FIG. 2 is a flow diagram of a process 200, consistent with this invention, for storing data in general hierarchal storage space 100. Process 200 may be implemented by an operating system or an application program running in processor 106. Alternatively, all or parts of process 200 are implemented by other portions of general hierarchical data storage space 100.

First, methods and systems consistent with this invention retrieve data stored in first storage space 102 for storage in second storage space 104 (step 201). Step 201 may be skipped in some instances when some of the data in first storage space 102 is already stored in second storage space 104. Such methods and systems then instruct the marking of scratch data that may be discarded at an address as invalid (step 202). Such methods and systems determine whether the retrieved data contains the scratch data stored at the memory address (step 204). The data stored at the memory address may occupy less space than a maximum capacity of the retrieved data. For instance, the space of the data stored at the memory address may be a line or a page of memory. If the retrieved data contains the data stored at the memory address (step 204), such methods and systems mark the scratch data at the memory address as invalid (step 206). This allows writing over the marked invalid data in the retrieved data with new data without copying the marked invalid data to first storage space 102 (step 208). Finally, such methods and systems may copy the new data from second storage space 104 to first storage space 102 (step 210). It is possible, however, that the new data may be marked invalid and copying the new data to first storage space 102 is unnecessary.

As process 200 demonstrates, methods and systems consistent with this invention may use the space in second storage space 104 that stores the scratch data without copying the scratch data to first storage space 102. This also saves clock cycles and increases the speed of processing data. Moreover, the marking of data as "invalid" helps to ensure that applications do not use this data which may not be accurate.

More specific embodiments of general hierarchical storage space 100 are described below. These embodiments include memory caching, disk caching, virtual memory, and NUMA-based applications.

Figure 3:
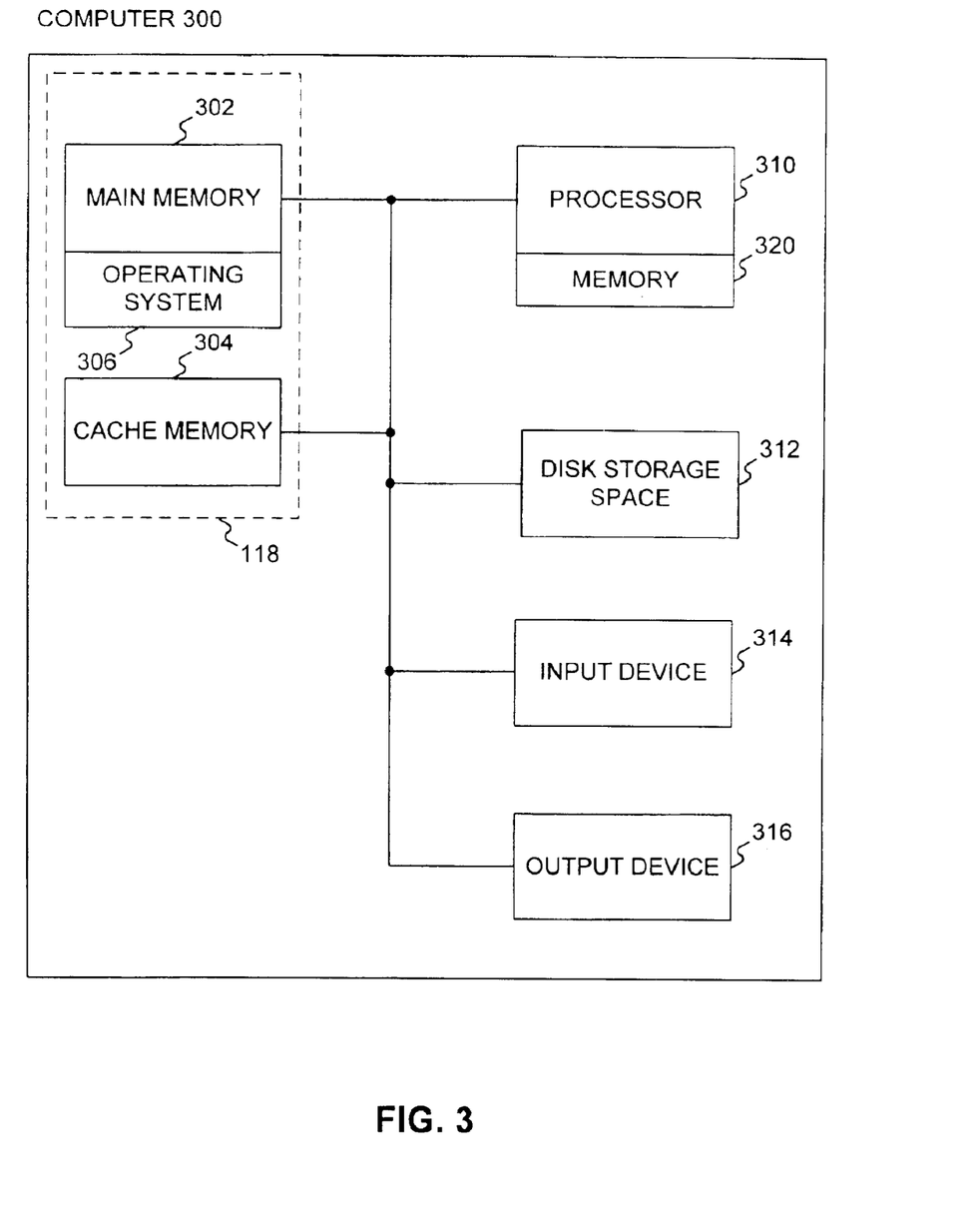
FIG. 3 is a block diagram of a data processing system in which methods and systems consistent with this invention may be implemented.

FIG. 3 is a block diagram of a data processing system, consistent with this invention, for memory caching. Computer 300 includes a main memory 302, such as a DRAM, and a cache memory 304 such as an SRAM. Main memory 302 and cache memory 304 makeup a hierarchical memory structure 318. Computer 300 also comprises a secondary storage device 312, a processor 310 such as a central processing unit (CPU), an input device 314, and an output device 316. Input device 314 may comprise a keyboard, a mouse, or both. Output device 316 may be a cathode ray tube (CRT) that can display a graphical user interface (GUI). Processor 310 may also comprise a processor memory 320. Main memory 302 holds an operating system 306 for operating the data processing of computer 300.

Methods and systems consistent with this invention hierarchically store data in computer 300 having main memory 302 and cache memory 304. Such methods and systems designate an area of cache memory 304 that contains scratch data as invalid, wherein the invalid data occupies less space than a maximum space of cache memory 304, and permit a writing over of the invalid data in cache memory 304 with new data. Such methods and systems may then copy only the not invalid data from cache memory 304 to main memory 302.

Figure 4:
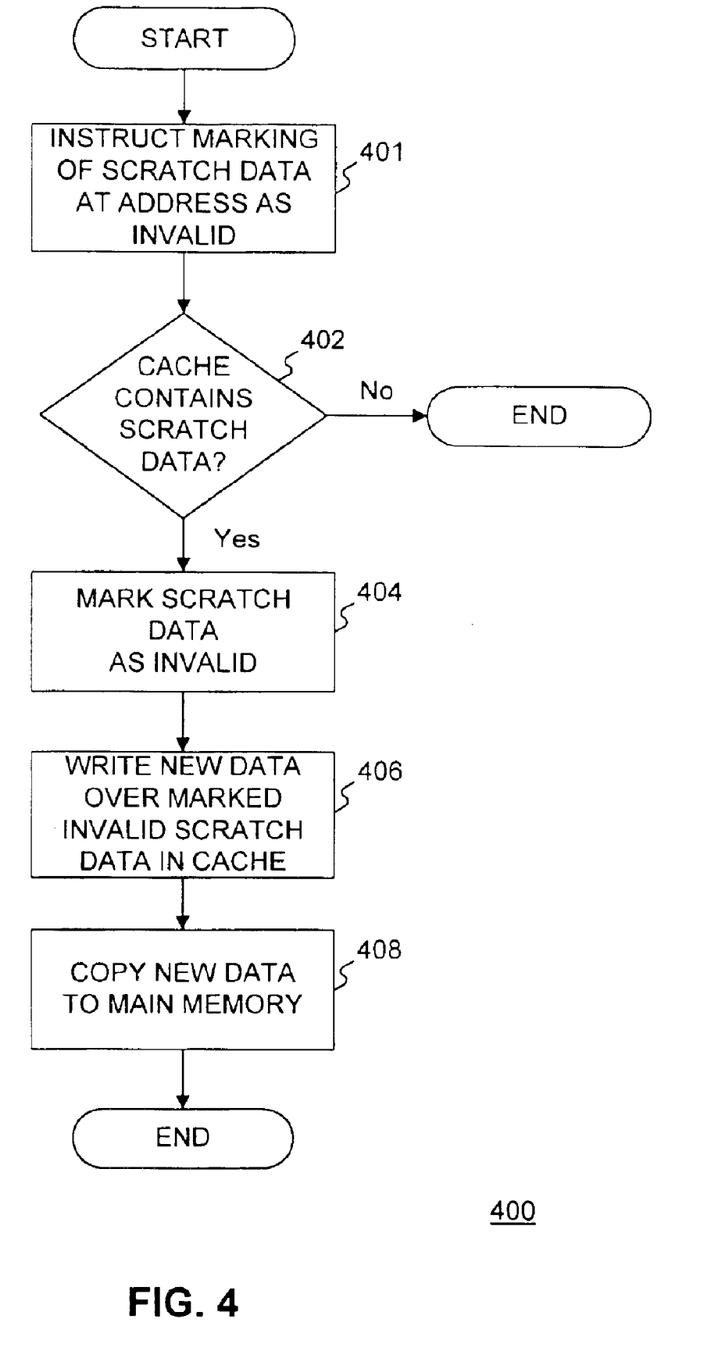
FIG. 4 is a flow diagram of a process for memory caching in the data processing system of FIG. 3 in a manner consistent with this invention.

For example, FIG. 4 is a flow diagram of a process 400, consistent with this invention, for memory caching in computer 300 in FIG. 3. Process 400 may be implemented by the operating system 306 or an application, running in processor 310. All or parts of process 400 may be implemented by cache memory 304 or other portions of computer 300.

First, methods and systems consistent with this invention instruct the marking of scratch data at an address as invalid (step 401). Such methods and systems determine whether cache memory 304 contains the scratch data stored at the memory address (step 402). This step may take place in at least either processor 310 or cache memory 304. The scratch data may occupy less space than a maximum space of the cache memory. For instance, the scratch data may be a line of memory, which is 64 bytes of information, whereas the maximum capacity of cache memory 304 is likely multiple megabytes. If cache memory 304 contains the scratch data (step 402), then such methods and systems mark the scratch data in cache memory 304 as invalid (step 404). This allows writing over the marked invalid data in cache memory 304 with new data without copying the scratch data to main memory 302 (step 406). Finally, such methods and systems may copy the new data to main memory 302 from cache memory 304, if necessary (step 408). It is possible, however, that the new data would also be marked invalid and copying the new data from cache memory 304 to main memory 302 is unnecessary.

Figure 5:
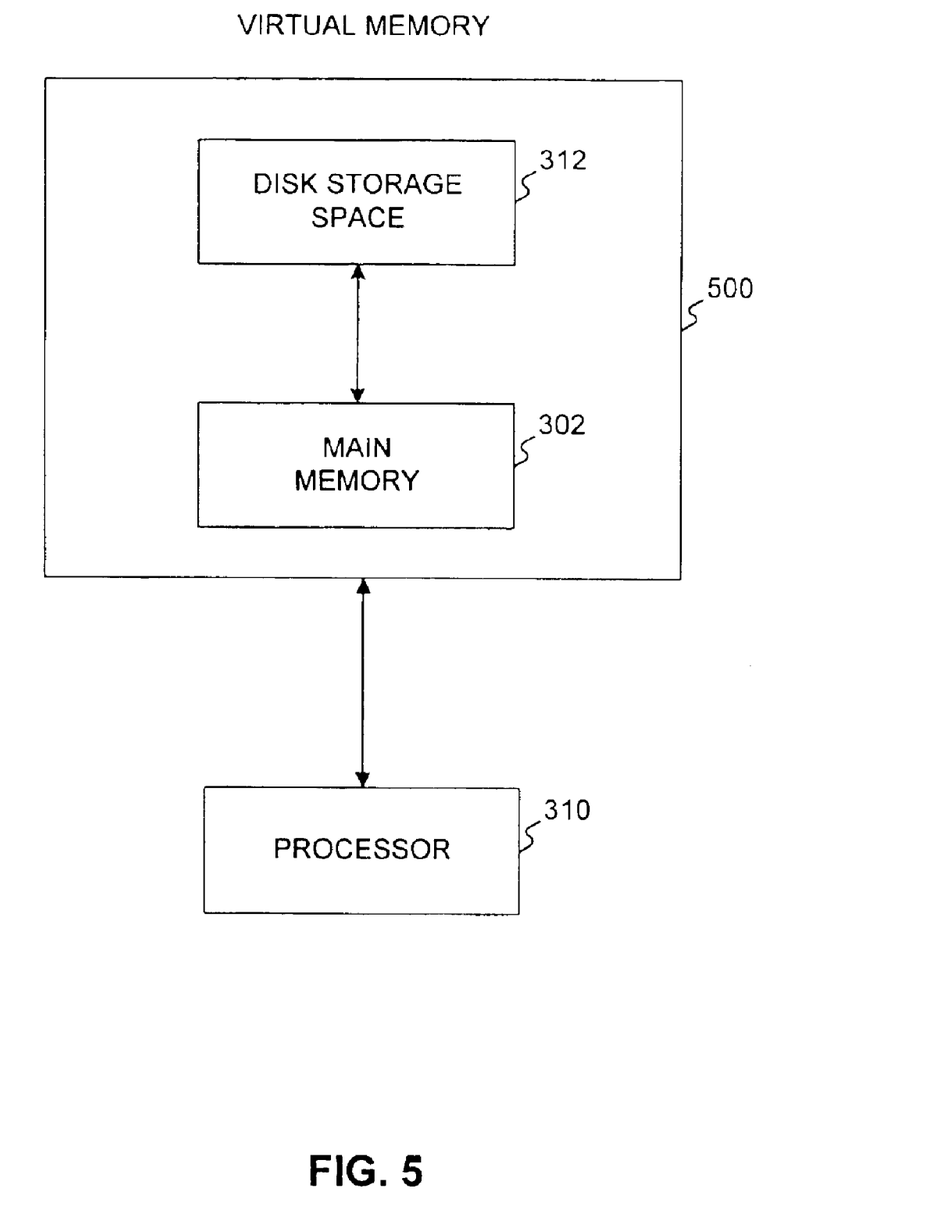
FIG. 5 is a block diagram of a data processing system, consistent with this invention, including a virtual memory.

FIG. 5 is a block diagram of a data processing system, consistent with this invention, including a virtual memory 500. Virtual memory 500 comprises main memory 302 and disk storage space 312. Processor 310 interacts with virtual memory 500 as though it were any hierarchical memory structure.

Methods and systems consistent with this invention hierarchically store data in computer 300 including virtual memory 500 having main memory 302 and disk storage space 312. Such methods and systems determine an area of main memory 302 that contains scratch data as invalid, and permit a writing over of the invalid data in main memory 302 with new data. Such methods and system may then copy only the not invalid data from main memory 302 to disk storage space 312.

Figure 6:
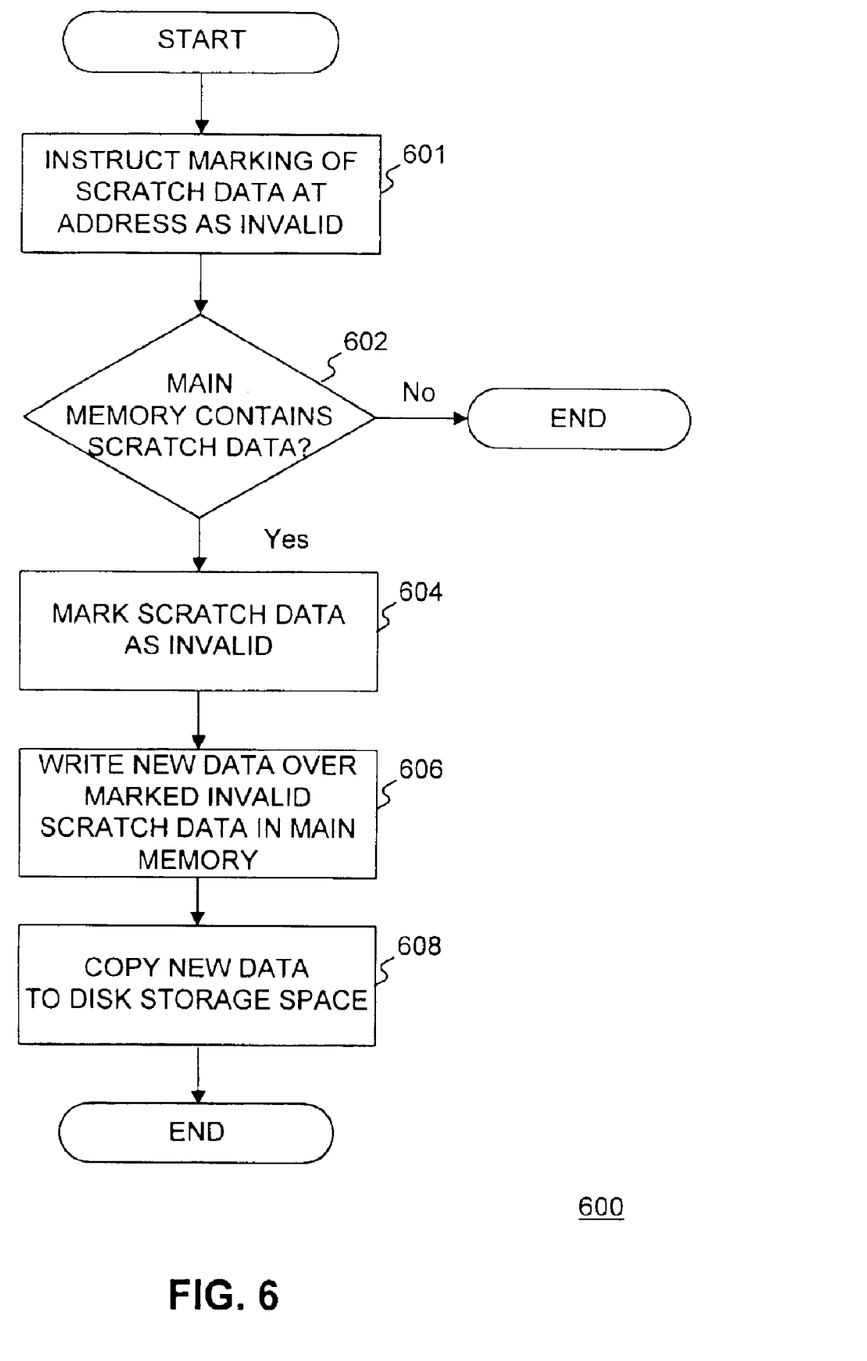
FIG. 6 is a flow diagram of a process for storing data in a computer system including the virtual memory of FIG. 5 in a manner consistent with this invention.

For example, FIG. 6 is a flow diagram of a process 600, consistent with this invention, for storing data in virtual memory 500 shown in FIG. 5. Process 600 may be implemented by operating system 306 or an application running in processor 310. All or parts of process 600 may also be implemented by other portions of computer 300.

First, methods and systems consistent with this invention instruct the marking of scratch data at a memory address as invalid (step 601). Such methods and systems determine whether main memory 302 contains the scratch data stored at the memory address (step 602). The scratch data may occupy less space than a maximum capacity of virtual memory 500 portion of main memory 302. For instance, the scratch data may be a page of memory, which is less than the maximum capacity of main memory 302. If main memory 302 contains the scratch data (step 602), such methods and systems mark the scratch data stored in main memory 302 as invalid (step 604). This allows writing over the marked invalid data in main memory 302, with new data without copying the scratch data to disk storage space 312 (step 606). Finally, such methods and systems may copy the new data to disk storage space 312 from main memory 302 if necessary (step 608). It is possible, however, that the new data would also be marked invalid and copying the new data from main memory 302 to disk storage space 312 is unnecessary.

Main memory 302 in FIG. 5 may also be replaced by a hierarchical memory structure, such as hierarchical memory structure 318. In this case, the present invention could be implemented both within hierarchical memory structure 318 and within virtual memory 500.

Figure 7:
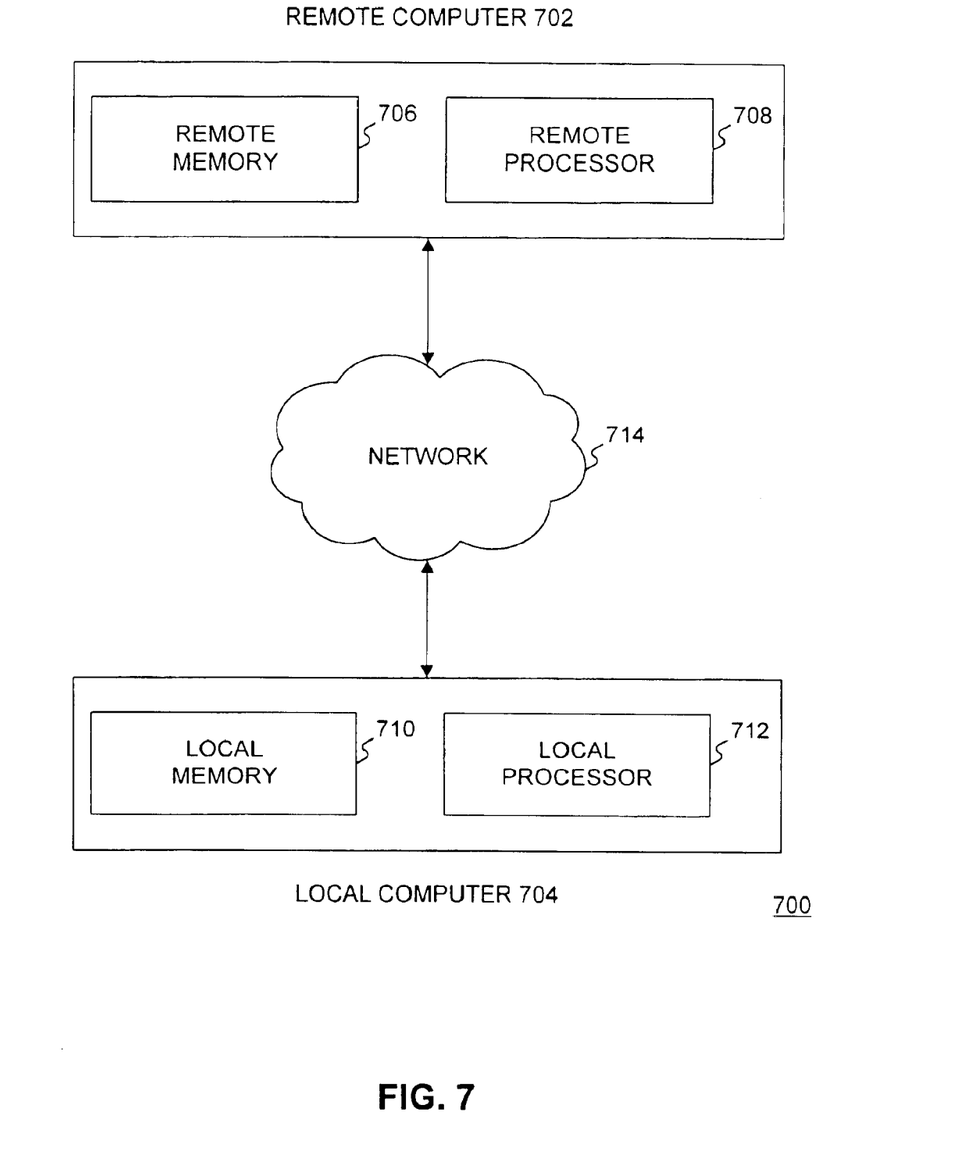
FIG. 7 is a block diagram of a data processing system, consistent with this invention, including a non-uniform memory access (NUMA) system.

FIG. 7 is a block diagram of a NUMA system 700, consistent with this invention. A remote computer comprises a remote memory 706 and a remote processor 708, such as a CPU. A local computer comprises a local memory 710 and a local processor 712, such as a CPU. Remote computer 702 and local computer 704 communicate with each other. For instance, remote and local computers 702, 704 may communicate with each other through network 714. Alternatively, first and second computers 702, 704 may communicate with each other in any other way.

Methods and systems consistent with this invention hierarchically store data in NUMA system 700 having remote memory 706 and local memory 704. Such methods and systems designate an area of local memory 704 that contains scratch data as invalid, and permit a writing over of the invalid data in local memory 704 with new data. Such methods and systems then may copy only the not invalid data to remote memory 706.

Figure 8:
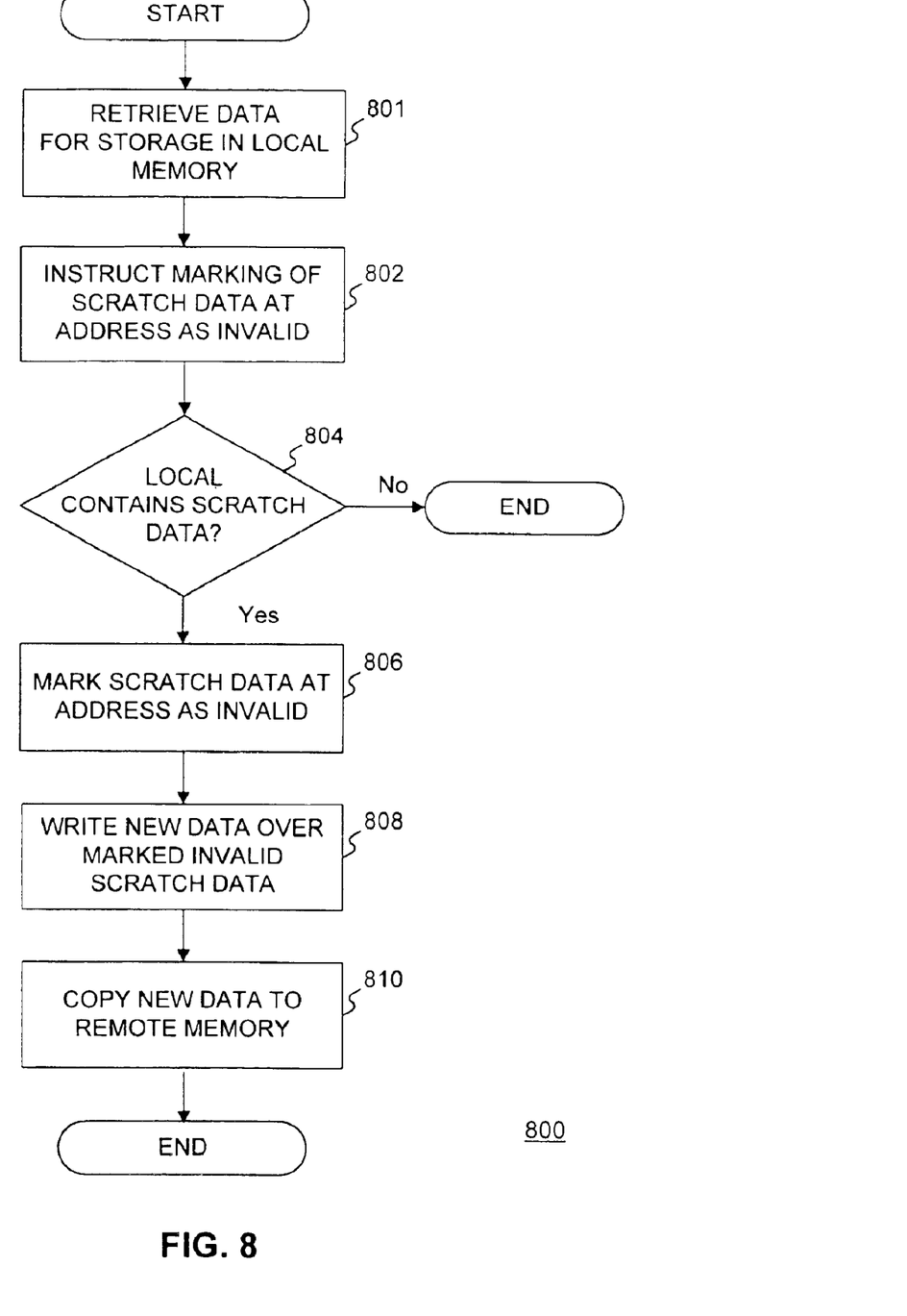
FIG. 8 is a flow diagram of a process for storing data in a computer system having the NUMA in FIG. 7 in a manner consistent with this invention.

For example, FIG. 8 is a flow diagram of a process 800, consistent with this invention, for hierarchically storing data in NUMA 700. Process 800 may be implemented by an operating system or application running in local processor 310. All or parts of process 800 may be implemented by other parts of NUMA 700.

First, methods and systems consistent with this invention may retrieve data stored at remote memory 706 for storage in local memory 710 (step 801). Step 101 may be skipped in some instances when some of the data in remote memory 506 is already stored in local memory 510. Such methods and systems instruct the marking of scratch data at an address as invalid (step 802). Such methods and systems determine whether the retrieved data stored in local memory 710 contains the scratch data stored at the memory address (step 804). The scratch data may occupy less space than a maximum capacity of the retrieved data. For instance, the scratch data may be a page of memory that is less than the maximum capacity of the retrieved data. If the retrieved data in local memory 710 contains the scratch data at the memory address (step 804), such methods and systems mark the scratch data as invalid (step 806). This allows writing over the marked invalid data with new data without copying the marked invalid data to remote memory 706 (step 808). Finally, such methods and systems may copy the new data to remote memory 706 (step 810). It is possible, however, that the new data may be marked invalid and copying the new data from local memory 706 to remote memory 710 is unnecessary.

As shown in FIG. 3 and process 400 of FIG. 4, first storage space 102 may be a main memory, and second storage space 104 may be a cache memory. Alternatively, as shown in FIG. 5 and process 600 of FIG. 6, general hierarchical storage space 100 may comprise a virtual memory. For instance, first storage space 102 may be a disk storage space, and second storage space 104 may be a main memory. Similarly, general hierarchical storage space 100 may be a disk cache system. For instance, first storage space 102 may be a disk storage space and second storage space 104 may be a disk cache in a main memory. Further, as shown in FIG. 7 and process 800 of FIG. 8, first storage space 102 and second storage space 104 may be a NUMA.

One skilled in the art will appreciate that numerous variations to this system exist. For instance, a cache memory may be a reserved section of a main memory instead of an independent device. Further, it is possible that there are several hierarchical layers in a hierarchical storage system. For instance, in memory caching, a second cache memory may be placed between a first cache and the processor. The first cache memory may be placed between the second cache memory and the processor. In fact, methods and systems consistent with this invention may use a hierarchical memory structure with any number of layers.

Further, a disk caching system consistent with this invention operates similarly to virtual memory 500. In a disk caching system consistent with this invention, a disk cache sits in main memory 302 between disk storage space 312 and processor 310, similar to FIG. 5. Further, a process similar to process 600 is implemented in a disk caching system consistent with this invention.

Although methods and systems consistent with the present invention have been described with reference to a preferred embodiment thereof, those skilled in the art knows various changes in form and detail which may be made without departing from the spirit and scope of the present invention as defined in the appended claims and their full scope of equivalents.

What is claimed is:

1. A method for storing data in a computer system comprising a first storage space for storing data, a second storage space for storing data, wherein the first storage space is lower in a hierarchy than the second storage space, the method comprising:

designating an area of the second storage space that contains scratch data, wherein the scratch data is data that has not been and will not be copied to the first storage space, and wherein the area of the second storage space is less then a full area of the second storage space; and permitting a writing over of the scratch data in the second storage space.

2. The method of claim 1, further comprising:

copying only non-scratch data from the second storage space to the first storage space.

3. The method of claim 1, further comprising:

determining whether data in the second storage space contains the scratch data stored at a memory address; and marking the scratch data in the second storage space as invalid, if the second storage space contains the scratch data.

4. The method of claim 1, wherein the first storage space is a main memory and the second storage space is a cache memory; wherein the scratch data occupies less space then a maximum space in the cache memory; and wherein designating an area of the second storage space comprises designating an area of the cache memory that contains the scratch data as invalid.

5. The method of claim 4, wherein the scratch data comprises a line; and wherein permitting the writing over of the scratch data comprises permitting the writing over of the line.

6. The method of claim 5, wherein the main memory is a DRAM and the cache memory is an SRAM.

7. The method of claim 1, wherein the first storage space is a disk storage space and the second storage space is a memory; and wherein designating an area of the second storage space comprises designating an area of the memory.

8. The method of claim 7, wherein the disk storage space and the memory comprise a virtual memory; and wherein designating an area of the second storage space comprises designating an area of the virtual memory that contains scratch data as invalid.

9. The method of claim 7, wherein the memory comprises a disk cache; and wherein designating an area of the second storage space comprises designating an area of the disk cache that contains scratch data as invalid.

10. The method of claim 7, wherein the memory comprises a cache memory; and wherein designating an area of the second storage space comprises designating an area of the cache memory that contains the scratch data as invalid.

11. The method of claim 7, wherein the scratch data comprises a page; and wherein permitting the writing over of the scratch data comprises permitting the writing over of the page.

12. The method of claim 1, wherein the first storage space is a first memory and the second storage space is a second memory; and wherein designating an area of the second storage space comprises designating an area of the second memory that contains scratch data as invalid.

13. The method of claim 12, wherein the scratch data comprises a page; and wherein permitting the writing over of the scratch data comprises permitting the writing over of the page.

14. The method of claim 12, wherein the first memory and the second memory comprise a non-uniform medium access system; and wherein designating an area of the second storage space comprises designating an area of the non-uniform memory access system.

15. The method of claim 1, wherein the scratch data is data that is temporarily needed to complete a function and is not an output of the function.

16. An apparatus for storing data in a computer system comprising:
 a first storage space for storing data;
 a second storage space for storing data, wherein the first storage space is lower in a hierarchy than the second storage space, and wherein the second storage space is configured to
  designate an area of the second storage space that contains scratch data, wherein the scratch data is data that has not been and will not be copied to the first storage space, and wherein the area of the second storage space is less then a full area of the second storage space; and
 permit a writing over of the scratch data in the second storage space.

17. The apparatus of claim 16, wherein the second storage space is further configured to copy only non-scratch data from the second storage space to the first storage space.

18. The apparatus of claim 16, wherein the second storage space is further configured to
 determine whether data in the second storage space contains the scratch data stored at a memory address; and
 mark the scratch data in the second storage space as invalid, if the second storage space contains the scratch data.

19. The apparatus of claim 16, wherein the first storage space is a main memory and the second storage space is a cache memory, wherein the scratch data occupies less space then a maximum space in the cache memory.

20. The apparatus of claim 19, wherein the scratch data comprises a line.

21. The apparatus of claim 19, wherein the main memory is a DRAM and the cache memory is an SRAM.

22. The apparatus of claim 16, wherein the first storage space is a disk storage space and the second storage space is a memory.

23. The apparatus of claim 22, wherein the disk storage space and the memory comprise a virtual memory.

24. The apparatus of claim 23, wherein the scratch data occupies less space than a maximum space of the virtual memory.

25. The apparatus of claim 22, wherein the memory comprises a disk cache.

26. The apparatus of claim 22, wherein the memory comprises a cache memory.

27. The apparatus of claim 22, wherein the scratch data comprises a page.

28. The apparatus of claim 16, wherein the first storage space is a first memory and the second storage space is a second memory; and wherein designating an area of the second storage space comprises designating an area of the second memory.

29. The apparatus of claim 28, wherein the scratch data comprises a page.

30. The apparatus of claim 28, wherein the first memory and the second memory comprise a non-uniform memory access system.

31. The apparatus of claim 16, wherein the scratch data is data that is temporarily needed to complete a function and is not an output of the function.

32. A computer-readable medium containing instructions for controlling a computer system comprising a first storage space and a second storage space, wherein the first storage space is lower in a hierarchy than the second storage space, to perform a method of operating a processor, the method comprising:
 designating an area of the second storage space that contains scratch data, wherein the scratch data is data that has not been and will not be copied to the first storage space, and wherein the area of the second storage space is less then a full area of the second storage space; and
 permitting a writing over of the scratch data in the second storage space.

33. The computer-readable medium of claim 32, wherein the method further comprises:
 copying only non-scratch data from the second storage space to the first storage space.

34. The computer-readable medium of claim 32, wherein the method further comprises:
 determining whether data in the second storage space contains the scratch data stored at a memory address; and
 marking the scratch data in the second storage space as invalid, if the second storage space contains the scratch data.

35. The computer-readable medium of claim 32, wherein the first storage space is a main memory and the second storage space is a cache memory, and wherein the scratch data occupies less space than a maximum space in the cache memory.

36. The computer-readable medium of claim 35, wherein the scratch data comprises a line.

37. The computer-readable medium of claim 35, wherein the main memory is a DRAM and the cache memory is an SRAM.

38. The computer-readable medium of claim 32, wherein the first storage space is a disk storage space and the second storage space is a memory.

39. The computer-readable medium of claim 38, wherein the disk storage space and the memory comprise a virtual memory.

40. The computer-readable medium of claim 39, wherein the scratch data occupies less space than a maximum space of the virtual memory.

41. The computer-readable medium of claim 38, wherein the memory comprises a disk cache.

42. The computer-readable medium of claim 38, wherein the memory comprises a cache memory.

43. The computer-readable medium of claim 38, wherein the scratch data comprises a page.

44. The computer-readable medium of claim 32, wherein the first storage space is a first memory and the second storage space is a second memory.

45. The computer-readable medium of claim 44, wherein the scratch data comprises a page.

46. The computer-readable medium of claim 44, wherein the first memory and the second memory comprise a non-uniform memory access system.

47. The computer-readable medium of claim 32, wherein the scratch data is data that is temporarily needed to complete a function and is not an output of the function.

48. A method for storing data in a computer system comprising a first storage space for storing data, a second storage space for storing data, the method comprising:
   storing data associated with an application in the second storage space;
   determining whether the second storage space contains scratch data that is no longer useful to the application and has not been and will not be copied to the first storage space, and wherein the area of the second storage space is less then a full area of the second storage space; and
   marking the scratch data such that the scratch data is not copied to the first storage space during execution of a coherence protocol that ensures data stored in the first storage space is current with respect to the second storage space.

49. The method of claim 48, wherein the first storage space is a main memory and the second storage space is a cache memory; wherein the marked data occupies less space then a maximum space in the cache memory; and wherein determining comprises determining whether the cache memory contains scratch data that is no longer useful to the application.

50. The method of claim 49, wherein the scratch data comprises a line; and wherein marking the scratch data comprises marking the line.

51. The method of claim 49, wherein the main memory is a DRAM and the cache memory is an SRAM; and wherein determining whether the cache memory contains scratch data comprises determining whether the SRAM contains scratch data that is no longer useful to the application.

52. The method of claim 48, wherein the first storage space is a disk storage space and the second storage space is a memory; and wherein determining comprises determining whether the memory contains scratch data that is no longer useful to the application.

53. The method of claim 52, wherein the disk storage space and the memory comprise a virtual memory; and wherein determining whether the memory contains the scratch data comprises determining whether the virtual memory contains the scratch data that is no longer useful to the application.

54. The method of claim 52, wherein the memory comprises a disk cache; and wherein determining whether the memory contains the scratch data comprises determining whether the disk cache contains the scratch data that is no longer useful to the application.

55. The method of claim 52, wherein the memory comprises a cache memory; and wherein determining whether the memory contains the scratch data comprises determining whether the cache memory contains the scratch data that is no longer useful to the application.

56. The method of claim 52, wherein the scratch data comprises a page; and wherein marking the scratch data comprises marking the page.

57. The method of claim 48, wherein the first storage space is a first memory and the second storage space is a second memory; and wherein determining whether the second storage space contains the scratch data comprises determining whether the second memory contains the scratch data that is no longer useful to the application.

58. The method of claim 57, wherein the scratch data comprises a page; and wherein marking the scratch data comprises marking the page.

59. The method of claim 57, wherein the first memory and the second memory comprise a non-uniform medium access system; and wherein determining whether the second memory contains the scratch data comprises determining whether the non-uniform medium access system contains the scratch data that is no longer useful to the application.

60. The method of claim 48, wherein the scratch data is data that is temporarily needed to complete a function and is not an output of the function.

61. An apparatus for storing data in a computer system comprising:
   a first storage space for storing data;
   a second storage space for storing data, wherein the first storage space is lower in a hierarchy than the second storage space, and wherein the second storage space is configured to
   store data associated with an application in the second storage space;
   determine whether the second storage space contains scratch data that is no longer useful to the application and has not been and will not be copied to the first storage space, and wherein the area of the second storage space is less then a full area of the second storage space; and
   mark the scratch data such that the scratch data is not copied to the first storage space during execution of a coherence protocol that ensures data stored in the first storage space is current with respect to the second storage space.

62. The apparatus of claim 61, wherein the first storage space is a main memory and the second storage space is a cache memory, wherein the marked data occupies less space then a maximum space in the cache memory.

63. The apparatus of claim 62, wherein the marked data comprises a line.

64. The apparatus of claim 62, wherein the main memory is a DRAM and the cache memory is an SRAM.

65. The apparatus of claim 61 wherein the first storage space is a disk storage space and the second storage space is a memory.

66. The apparatus of claim 65, wherein the disk storage space and the memory comprise a virtual memory.

67. The apparatus of claim 66, wherein the marked data occupies less space than a maximum space of the virtual memory.

68. The apparatus of claim 65, wherein the memory comprises a disk cache.

69. The apparatus of claim 65, wherein the memory comprises a cache memory.

70. The apparatus of claim 65, wherein the marked data comprises a page.

71. The apparatus of claim 61, wherein the first storage space is a first memory and the second storage space is a second memory.

72. The apparatus of claim 71, wherein the marked data comprises a page.

73. The apparatus of claim 71, wherein the first memory and the second memory comprise a non-uniform memory access system.

74. The apparatus of claim 61, wherein the scratch data is data that is temporarily needed to complete a function and is not an output of the function.

75. A computer-readable medium containing instructions for controlling a computer system comprising a first storage space and a second storage space, wherein the first storage space is lower in a hierarchy than the second storage space, to perform a method of operating a processor, the method comprising:
   storing data associated with an application in the second storage space;
   determining whether the second storage space contains scratch data that is no longer useful to the application and has not been and will not be copied to the first storage space, and wherein the area of the second storage space is less then a full area of the second storage space; and
   marking the scratch data such that the scratch data is not copied to the first storage space during execution of a coherence protocol that ensures data stored in the first storage space is current with respect to the second storage space.

76. The computer-readable medium of claim 75, wherein the first storage space is a main memory and the second storage space is a cache memory, and wherein the scratch data occupies less space than a maximum space in the cache memory.

77. The computer-readable medium of claim 76, wherein the marked data comprises a line.

78. The computer-readable medium of claim 76, wherein the main memory is a DRAM and the cache memory is an SRAM.

79. The computer-readable medium of claim 75, wherein the first storage space is a disk storage space and the second storage space is a memory.

80. The computer-readable medium of claim 79, wherein the disk storage space and the memory comprise a virtual memory.

81. The computer-readable medium of claim 80, wherein the marked data occupies less space than a maximum space of the virtual memory.

82. The computer-readable medium of claim 79, wherein the memory comprises a cache memory.

83. The computer-readable medium of claim 79, wherein the memory comprises a cache memory.

84. The computer-readable medium of claim 79, wherein the marked data comprises a page.

85. The computer-readable medium of claim 75, wherein the first storage space is a first memory and the second storage space is a second memory.

86. The computer-readable medium of claim 85, wherein the marked data stored at the memory address comprises a page.

87. The computer-readable medium of claim 85, wherein the first memory and the second memory comprise a non-uniform memory access system.

88. The computer-readable medium of claim 75, wherein the scratch data is data that is temporarily needed to complete a function and is not an output of the function.

89. A method for storing data in a computer system comprising a first storage space for storing data, a second storage space for storing data, wherein the first storage space is lower in a hierarchy than the second storage space, the method comprising:
   instructing a marking of scratch data stored at a memory address in the second storage space:
   designating an area of the second storage space that contains the scratch data as invalid; wherein designating the area comprises
      determining whether data in the second storage space contains the scratch data stored at the memory address; and
      marking the scratch data in the second storage space as invalid, if the second storage space contains the scratch data; and
   permitting a writing over of the invalid data in the second storage space.

90. An apparatus for storing data in a computer system comprising:
   a first storage space for storing data;
   a second storage space for storing data, wherein the first storage space is lower in a hierarchy than the second storage space, and wherein the second storage space is configured to
      instruct a marking of scratch data stored at a memory address in the second storage space;
      designate an area of the second storage space that contains the scratch data as invalid; wherein designating the area of the second storage space comprises
         determining whether data in the second storage space contains the scratch data stored at a memory address; and
         marking the scratch data in the second storage space as invalid, if the second storage space contains the scratch data; and
      permit a writing over of the invalid data in the second storage space.

91. A computer-readable medium containing instructions for controlling a computer system comprising a first storage space and a second storage space, wherein the first storage space is lower in a hierarchy than the second storage space, to perform a method of operating a processor, the method comprising:
   instructing a marking of scratch data stored at a memory address in the second storage space;
   designating an area of the second storage space that contains the scratch data as invalid; wherein designating the area comprises
      determining whether data in the second storage space contains the scratch data stored at the memory address; and
      marking the scratch data in the second storage space as invalid, if the second storage space contains the scratch data; and
   permitting a writing over of the invalid data in the second storage space.

* * * * *

UNITED STATES PATENT AND TRADEMARK OFFICE
CERTIFICATE OF CORRECTION

PATENT NO. : 6,910,107 B1
DATED : June 21, 2005
INVENTOR(S) : Michael Boucher

It is certified that error appears in the above-identified patent and that said Letters Patent is hereby corrected as shown below:

Column 8,
Line 43, "less then" should read -- less than --.
Line 59, "less space then" should read -- less space than --.

Column 9,
Line 1, "claim 5," should read -- claim 4, --.
Line 52, "less then" should read -- less than --.

Column 10,
Lines 1-2, "less space then" should read -- less space than --.
Line 44, "less then" should read -- less than --.

Column 11,
Line 39, "less then" should read -- less than --.
Lines 48-49, "less space then" should read -- less space than --.

Column 12,
Lines 21-22, "comprises-determining" should read -- comprises determining --.
Line 50, "less then" should read -- less than --.
Lines 59-60, "less space then" should read -- less space than --.

Column 13,
Line 32, "less then" should read -- less than --.

Signed and Sealed this

Twenty-third Day of August, 2005

JON W. DUDAS
*Director of the United States Patent and Trademark Office*